United States Patent
Gupta (10) Patent No.: US 10,318,249 B2
(45) Date of Patent: Jun. 11, 2019

(54) EXTENDING PROGRAMMER WORKBENCHES FOR HANDLING PROGRAMMING LANGUAGE DIFFERENCES

(71) Applicant: International Business Machines Corporation, Armonk, NY (US)

(72) Inventor: Monika Gupta, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/733,424

(22) Filed: Jun. 8, 2015

(65) Prior Publication Data

US 2016/0357518 A1    Dec. 8, 2016

(51) Int. Cl.
G06F 8/73   (2018.01)
G06F 8/30   (2018.01)
G06F 9/451  (2018.01)
G06F 9/44   (2018.01)

(52) U.S. Cl.
CPC .............. G06F 8/31 (2013.01); G06F 9/4446 (2013.01); G06F 9/453 (2018.02)

(58) Field of Classification Search
CPC ................................. G06F 8/31; G06F 9/4446
See application file for complete search history.

(56) References Cited

U.S. PATENT DOCUMENTS 6,799,718 B2   10/2004  Chan et al.
6,832,365 B1   12/2004  Chiles et al.
7,376,935 B2    5/2008  Bartz et al.
7,669,178 B2    2/2010  Chiles et al.
2005/0081193 A1* 4/2005 Chiles .................. G06F 8/36
                                                    717/136

(Continued)

OTHER PUBLICATIONS

"Java and C# Comparison", Jan. 31, 2011, Harding.edu, http://www.harding.edu/fmccown/java_csharp_comparison.html, retrieved: Jul. 12, 2016.*

(Continued)

*Primary Examiner* — Li B. Zhen
*Assistant Examiner* — Amir Soltanzadeh
(74) *Attorney, Agent, or Firm* — Ryan, Mason & Lewis, LLP (57) ABSTRACT

Methods, systems, and computer program products for extending programmer workbenches for handling programming language differences are provided herein. A method includes determining syntactic differences between a first programming language and a second programming language; determining semantic differences between the first programming language and the second programming language; creating a comparative help list for the first programming language and the second programming language by generating, for each of multiple language elements in the first programming language, an entry for the comparative help list that comprises a correlation of items of content, the items being associated with a given language element of the first programming language to language elements of the second programming language, wherein said correlation is based on (i) the syntactic differences and (ii) the semantic differences; and outputting at least a portion of the comparative help list to a component associated with a user.

13 Claims, 3 Drawing Sheets

(56) References Cited

U.S. PATENT DOCUMENTS

| | | | | |
|---|---|---|---|---|
| 2007/0038985 | A1* | 2/2007 | Meijer | G06F 8/51 |
| | | | | 717/137 |
| 2007/0169018 | A1* | 7/2007 | Coward | G06F 8/51 |
| | | | | 717/136 |
| 2007/0260648 | A1* | 11/2007 | Friesenhahn | G06F 17/30011 |
| 2008/0168421 | A1* | 7/2008 | Meijer | G06F 8/31 |
| | | | | 717/106 |
| 2011/0088009 | A1* | 4/2011 | Jones | G06F 9/4446 |
| | | | | 717/100 |
| 2013/0297700 | A1* | 11/2013 | Hayton | G06Q 10/10 |
| | | | | 709/204 |
| 2014/0067371 | A1* | 3/2014 | Liensberger | G06F 17/24 |
| | | | | 704/9 |
| 2014/0282444 | A1* | 9/2014 | Araya | G06F 8/42 |
| | | | | 717/143 |
| 2015/0020042 | A1* | 1/2015 | Kopecz | G06F 8/34 |
| | | | | 717/101 |

OTHER PUBLICATIONS

Carlos Aguilar Mares, "CodeTranslator: Code Translation From VB.NET <-> C# <-> TypeScript <-> Java", Mar. 24, 2005, URL: http://www.carlosag.net/tools/codetranslator/.*

Domingue et al. Fostering Debugging Communities on the Web, Communications of the ACM, Apr. 1997, vol. 40, No. 4, pp. 65-71. http://dl.acm.org/citation.cfm?id=248460.

Bani-Salameh et al. Integrating Collaborative Program Development and Debugging within a Virtual Environment, R. O. Briggs et al. (Eds.): CRIWG 2008, LNCS 5411, pp. 107-120, 2008. http://link.springer.com/chapter/10.1007/978-3-540-92831-7_10.

* cited by examiner

FIG. 3 ial illustrating system architecture,
EXTENDING PROGRAMMER WORKBENCHES FOR HANDLING PROGRAMMING LANGUAGE DIFFERENCES

FIELD

The present application generally relates to information technology, and, more particularly, to programming language management techniques.

BACKGROUND

Programmers often play multiple roles including web designer, user interface (LU) expert, servlet programmer, etc. Switching between roles often includes switching between multiple languages such as Java, JavaScript, PHP, etc. Programmers can often code with certain assumptions about semantics (based, for example, on the language in which he or she is most proficient), but such assumptions can be incorrect. Language differences can be derived from language features and/or standard library functions coming from different languages that may look, similar but differ in semantics, and such differences can be a potential sources of bugs.

The need for working on individual programming languages cannot be eliminated, as any abstract layer laid over a set of programming languages may not be flexible enough to model all requirements. Additionally, new libraries continue to be added to existing languages.

SUMMARY

In one aspect of the present invention, techniques for extending programmer workbenches for handling programming language differences are provided. As detailed herein an exemplary computer-implemented method can include steps of determining one or more syntactic differences between a first programming language and a second programming language; determining one or more semantic differences between the first programming language and the second programming language; creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences; and outputting at least a portion of the comparative help list to a component associated with a user for use in conjunction with a programming task.

In another aspect of the invention, an exemplary computer-implemented method can include steps of determining one or more syntactic differences between a first programming language and a second programming language; determining one or more semantic differences between the first programming language and the second programming language; creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences; updating the comparative help list based on input provided by a first user to create an updated comparative help list; and outputting at least a portion of the updated comparative help list to a component associated with a second user for use in conjunction with a programming task.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes extending programmer workbenches for handling programming language differences and varying programmer experience. Additionally, at least one embodiment of the invention includes supporting language application programming interface (APT) differences across multiple languages, and providing capabilities to record user feedback on language APIs and proactively assist during coding.

As detailed herein, given syntactic and semantic programming language differences (derived, for instance, from active computations), at least one embodiment of the invention includes creating help lists from such programming language differences and providing the help lists to users as the users work on a workbench. Such provision of the help lists can take various forms. By way of example, provision of the help lists can include offering content from the help lists as auto-correct suggestions, example use cases, a binary executable, an automatic code-snippet conversion, etc. Such provision can result, for example, in increasing the productivity of the users and decreasing or eliminating many bugs at coding time.

Additionally, comparative help can he provided to a user based on the user's choice of primary language and current language. By way of illustration, the user can provide a selection of his or her primary language (for example, a language in which he or she is most comfortable and/or proficient). Based on this user-given language choice (such as, for example, Java) and the current language in which the user is tasked to code (the user may not have an in-depth knowledge of this language; for example, JavaScript), at least one embodiment of the invention includes generating and providing to the user one or more comparative help lists. As described herein, comparative help lists provide syntactic assistance (in the form of capability to automatically translate code from a primary language to a (different) current language) and semantic assistance (in the form of one or more warning messages) on the current language.

At least one embodiment of the invention includes facilitating a user to generate his or her own help items, which can include, for example, code snippets and/or text, test cases, video images, executables, etc. Additionally, such an embodiment can also include associating the help items with various programming language elements. These help items may be comparative or general, and can be based on the given user's own programming knowledge and experience.

Further, in at least one embodiment of the invention, an integrated development environment (IDE) can store the help items in a help list store and subsequently provide the help items when the given user works (again) on the corresponding language element. Also, one or more embodiments of the invention include enabling a user to share his or her help lists with peers and/or other users (for example, in a social network setting).

Figure 1:
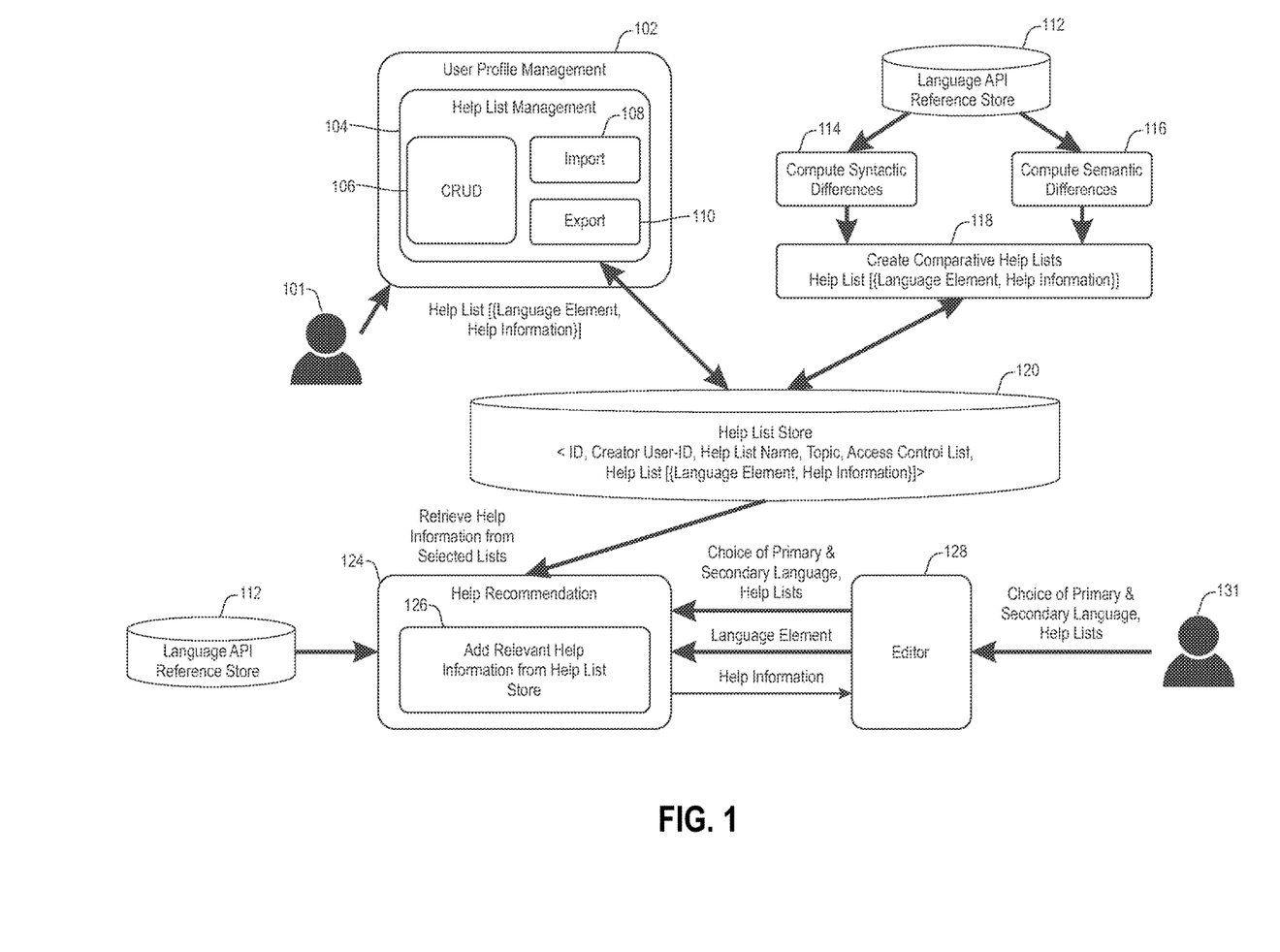
FIG. 1 is a diagram illustrating system architecture, according to an example embodiment of the invention.

FIG. 1 is a diagram illustrating system architecture, according to an embodiment of the invention. By way of illustration, FIG. 1 depicts a first user 101 and a second user 131, as well as a user profile management component 102, and a language API reference store component 112, which provides input to a syntactic differences computation component 114 and a semantic differences computation component 116, which both provide input to a comparative help lists creation component 118.

Computation of syntactic and semantic differences between two (or more) languages can be carried out in various manners. For example, computation of syntactic and semantic differences can be carried out by language experts manually examining the two relevant language APIs. Additionally, computation of syntactic and semantic differences can be carried out by a user who ends up in a bug when working on an element of a language in which he or she is not proficient. Also, computation of syntactic and semantic differences can be carried out by computer-aided techniques such as, for example, automated examination of API specifications. Further, computation of syntactic and semantic differences can be carried out by incorporation of documented differences, as well as utilization of a library coder community. As new language features become available in the form of new libraries, a library coder community can compute and provide differences (with other prevalent language choices) to enable quick onboarding of new users.

Moreover, at least one embodiment of the invention further includes converting such differences between languages into a help list format, and subsequently providing such help lists to programmer workbenches to increase productivity.

As also depicted in FIG. 1, the user profile management component 102 includes a help list management component 104, which further includes a create, read, update and delete (CRUD) component 106, an import component 108 and an export component 110. Accordingly, in connection with CRUD component 106, user 101 can create, update and/or delete a new help list (or update an existing help list) in his or her profile (via component 102). Such user action can include an input in the form, for example, of <Identifier (ID), Creator User-ID, Help List Name, Topic, Language, Access Control List, Help List [{Language Element, Help information}]>.

Also, in connection with import component 108 and export component 110, user 101 can import one or more desired help lists to which user 101 has access into his or her account, and user 101 can export and/or push one or more of his or her help lists to a help list store 120 and set access privileges thereon.

In at least one embodiment of the invention, the user profile management component 102 is a part of programmer's workbench. Additionally, such an embodiment can also include a global help list repository (for example, an enterprise-wide repository such as help list store 120 that can be used by all people of that enterprise/organization). Also, each programmer workbench can have its own help list store. As noted, a user can create an account in his or her workbench, and create/update/delete (via component 106 his or her own help lists. Also, a user can import (via component 108) one or more help lists to his or her workbench from a global help list repository (such as, for example, help list store 120), and a user can also export (via component 110) his or her help list to the global help list repository (such as, for example, help list store 120). Additionally, a user can share his or her help list with peers working on the same workbench by exercising appropriate access control.

As noted in connection with component 118, at least one embodiment of the invention includes creating comparative help lists. In such an embodiment, component 114 carries out a computation of syntactic differences between two languages—Language 1 and Language 2 in the following examples—and component 116 carries out a computation of semantic differences between the two languages. By way of illustration, for each language element in Language 1, component 118 can create a help list entry as follows: {Language 1 Element, Help Information on corresponding Language 2 Element}. By way of further illustration, consider the following example implementation:

```
{   // Language 1 - JavaScript; Language 2 - Java
    Language1 Element: "str_replace",
    Help Text: "Unlike Java str_replace function, it will only replace the first instance of pattern"
}
{   // Language 1 - Java; Language 2 - C#
    Language1 Element: "synchronized",
    Help Text: "Replace with equivalent function 'lock' in C#"
}
```

As also depicted in FIG. 1, the help list store 120 can provide input to a help recommendation component 124, which also receives input from language API reference store 112. Help recommendation component 124 additionally includes an input component 126 that can be implemented to add relevant help information from the help list store 120. By way of example, help information can include a variety of information such as text, video, images, executables, etc.

Further, as illustrated in FIG. 1, second user 131 inputs a choice of primary and secondary languages as well as one or more help lists to an editor component 128. The editor component 128 subsequently provides this user input as well as one or more language elements to the help recommendation component 124, which in turn, provides an output of help information to the editor component 128. As used herein, a primary language can refer, for example, to the language in which the user is most proficient, and a secondary language can refer, for example, to the language in which the user is currently coding.

Figure 2:
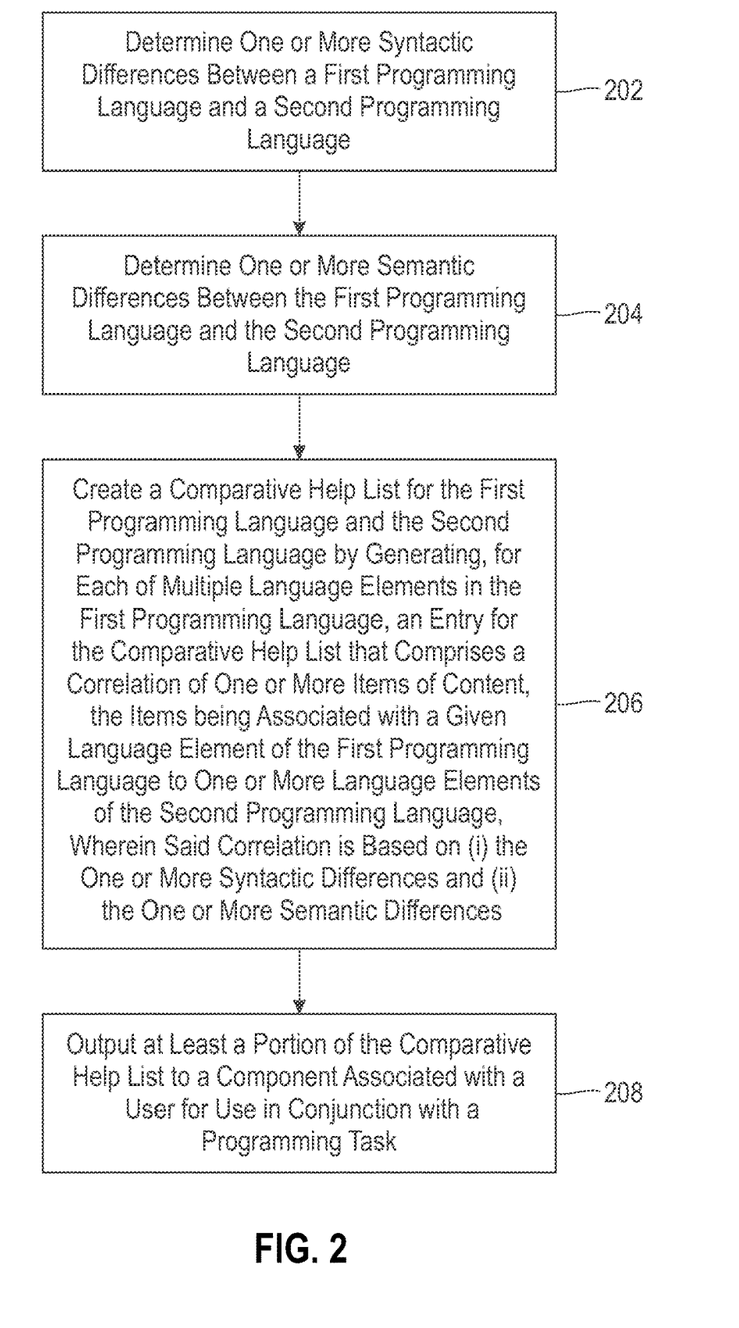
FIG. 2 is a flow diagram illustrating techniques according to an embodiment of the invention.

FIG. 2 is a flow diagram illustrating techniques according to an embodiment of the present invention. Step 202 includes determining one or more syntactic differences between a first programming language and a second programming language, wherein said determining one or more syntactic differences is executed by a syntactic differences computation component of a computing device.

Step 204 includes determining one or more semantic differences between the first programming language and the second programming language, wherein said determining one or more semantic differences is executed by a semantic differences computation component of a computing device.

Step 206 includes creating a comparative help list for the first programming language and the second programming language by generating, for each of multiple language elements in the first programming language, an entry for the comparative help to list that comprises a correlation of one or more items of content, the items being associated with a given language element of the first programming language to one or more language elements of the second programming language, wherein said correlation is based on (i) the one or more syntactic differences and (ii) the one or more semantic differences, and wherein said creating the comparative help list is executed by a comparative help list creation component of a computing device. The one or more items of content can include text content, video content, image content and/or executable content.

Step 208 includes outputting at least a portion of the comparative help list to a component associated with a user for use in conjunction with a programming task. Outputting can include outputting the at least a portion of the comparative help list to the component associated with the user based on input submitted by the user. Such input can include (i) an identification of a primary language and (ii) an identification of a secondary language, wherein the primary language is a language in which the user has a given level of proficiency, and wherein the secondary language is a language in which the user is carrying out the programming task.

The techniques depicted in FIG. 2 can additionally include storing the comparative help list, in a component associated with a given user, with one or more additional comparative help lists.

Also, an additional aspect of the invention includes determining one or more syntactic differences between a first programming language and a second programming language; determining one or more semantic differences between the first programming language and the second programming language; creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences; updating the comparative help list based on input provided by a first user to create an updated comparative help list; and outputting at least a portion of the updated comparative help list to a component associated with a second user for use in conjunction with a programming task.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
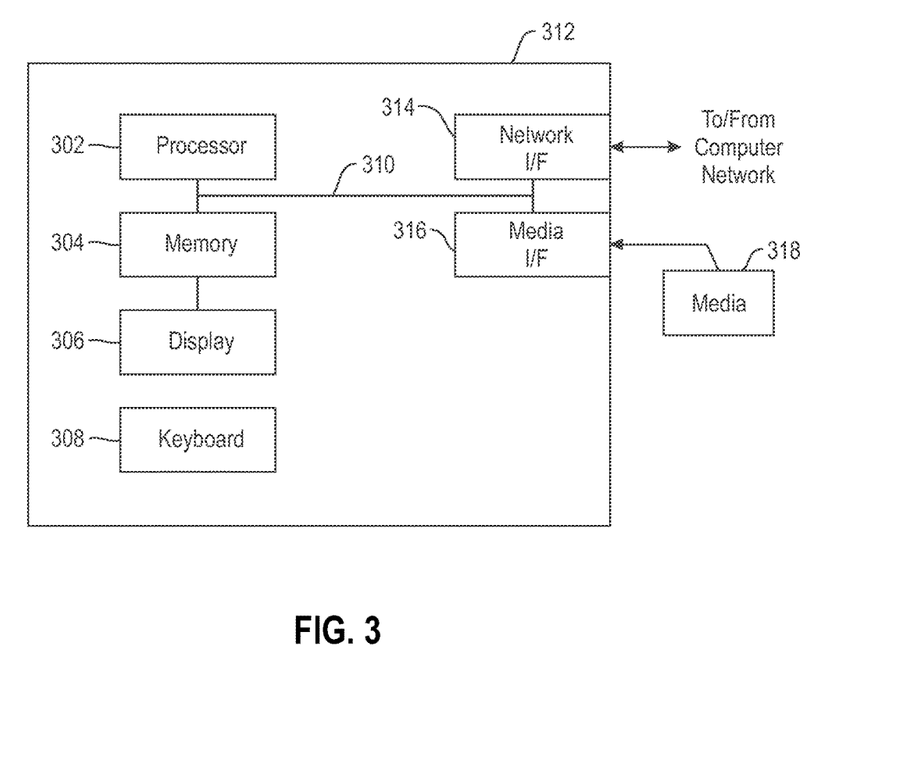
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory)

and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable mad-only memory (EPROM or Flash memory), a static random access memory (SRAM), a portable compact disc read-only memory (CD-ROM), a digital versatile disk (MD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the. Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carded out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, computing syntactic and semantic differences between two programming languages to generate a help list to aid a programmer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising steps of:
   determining one or more syntactic differences between a first programming language and a second programming language;
   determining one or more semantic differences between the first programming language and the second programming language;
   creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences, and wherein the comparative help list comprises content offered in the form of (a) one or more auto-correct suggestions, (b) one or more example use cases, (c) one or more binary executables, and (d) one or more automatic code-snippet conversions;
   importing one or more user-generated help lists, wherein each user-generated help list comprises (i) a user identifier (ii) a help list name, (iii) an access control list that identifies each of one or more users that can access the user-generated help list, and (iv) one or more pairs of (a) programming language elements and (b) help information;
   storing (i) said comparative help list and (ii) said one or more user-generated help lists in a database; and
   outputting (i) at least a portion of said comparative help list and (ii) at least a portion of said one or more user-generated help lists to an access-appropriate user, for use in conjunction with a programming task being carried out by the user, based on input submitted by the user, wherein said input comprises (a) an identification of a user-preferred programming language, (b) an identification of the current programming language of the programming task, and (c) the user's programming experience;
   wherein the steps are carried out by at least one computing device.

2. The method of claim 1, wherein said one or more items of content comprises text content, video content, image content and/or executable content.

3. The method of claim 1, wherein said user-preferred programming language is a language in which the user has a given level of proficiency, and wherein said current programming language of the programming task is a language in which the user is carrying out the programming task.

4. A computer program product, the computer program product comprising a computer readable storage medium having program instructions embodied therewith, the program instructions executable by a computing device to cause the computing device to:
determine one or more syntactic differences between a first programming language and a second programming language;
determine one or more semantic differences between the first programming language and the second programming language;
create a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences, and wherein the comparative help list comprises content offered in the form of (a) one or more auto-correct suggestions, (b) one or more example use cases, (c) one or more binary executables, and (d) one or more automatic code-snippet conversions;
import one or more user-generated help lists, wherein each user-generated help list comprises (i) a user identifier (ii) a help list name, (iii) an access control list that identifies each of one or more users that can access the user-generated help list, and (iv) one or more pairs of (a) programming language elements and (b) help information;
store (i) said comparative help list and (ii) said one or more user-generated help lists in a database; and
output (i) at least a portion of said comparative help list and (ii) at least a portion of said one or more user-generated help lists to an access-appropriate user, for use in conjunction with a programming task being carried out by the user, based on input submitted by the user, wherein said input comprises (a) an identification of a user-preferred programming language, (b) an identification of the current programming language of the programming task, and (c) the user's programming experience.

5. The computer program product of claim 4, wherein said one or more items of content comprise text content, video content, image content and/or executable content.

6. A system comprising:
a memory; and
at least one processor coupled to the memory and configured for:
determining one or more syntactic differences between a first programming language and a second programming language;
determining one or more semantic differences between the first programming language and the second programming language;
creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences, and wherein the comparative help list comprises content offered in the form of (a) one or more auto-correct suggestions, (b) one or more example use cases, (c) one or more binary executables, and (d) one or more automatic code-snippet conversions;
importing one or more user-generated help lists, wherein each user-generated help list comprises (i) a user identifier (ii) a help list name, (iii) an access control list that identifies each of one or more users that can access the user-generated help list, and (iv) one or more pairs of (a) programming language elements and (b) help information;
storing (i) comparative help list and (ii) said one or more user-generated help lists in a database; and
outputting (i) at least a portion of said comparative help list and (ii) at least a portion of said one or more user-generated help lists to an access-appropriate user, for use in conjunction with a programming task being carried out by the user, based on input submitted by the user, wherein said input comprises (a) an identification of a user-preferred programming language, (b) an identification of the current programming language of the programming task, and (c) the user's programming experience.

7. A method, comprising steps of:
determining one or more syntactic differences between a first programming language and a second programming language;
determining one or more semantic differences between the first programming language and the second programming language;
creating a comparative help list for the first programming language and the second programming language by generating, for each of multiple language elements in the first programming language, an entry for the comparative help list that comprises a correlation of one or more items of content, the items being associated with a given language element of the first programming language to one or more language elements of the second programming language, wherein said correlation is based on (i) the one or more syntactic differences and (ii) the one or more semantic differences, and wherein the comparative help list comprises content offered in the form of (a) one or more auto-correct suggestions, (b) one or more example use cases, (c) one or more binary executables, and (d) one or more automatic code-snippet conversions;
updating the comparative help list based on input, wherein the input comprises (i) a user identifier (ii) a help list name, (iii) an access control list that identifies each of one or more users that can access the comparative help list, and (iv) one or more pairs of (a) programming language elements and (b) help information, provided by a first user to create an updated comparative help list; and
outputting at least a portion of the updated comparative help list to a component associated with an access-appropriate second user, for use in conjunction with a programming task being carried out by the second user, based on input submitted by the user, wherein said input comprises (a) an identification of a user-preferred programming language, (b) an identification of the current programming language of the programming task, and (c) the user's programming experience;

wherein the steps are carried out by at least one computing device.

8. The method of claim 7, wherein said one or more items of content comprise text content, video content, image content and/or executable content.

9. The method of claim 7, wherein said user-preferred programming language is a language in which the user has a given level of proficiency, and wherein said current programming language of the programming task is a language in which the user is carrying out the programming task.

10. The method of claim 7, comprising:

storing the updated comparative help list, in a component associated with a given user, with one or more additional comparative help lists.

11. The method of claim 1, comprising:

sharing the stored (i) comparative help list and (ii) one or more user-generated help lists with one or more users of an enterprise and/or a social network group.

12. The method of claim 1, wherein the one or more user-generated help lists include one or more auto-correct suggestions.

13. The method of claim 7, comprising:

sharing the updated comparative help list with one or more users of an enterprise and/or a social network group.

\* \* \* \* \*